Patented June 21, 1938

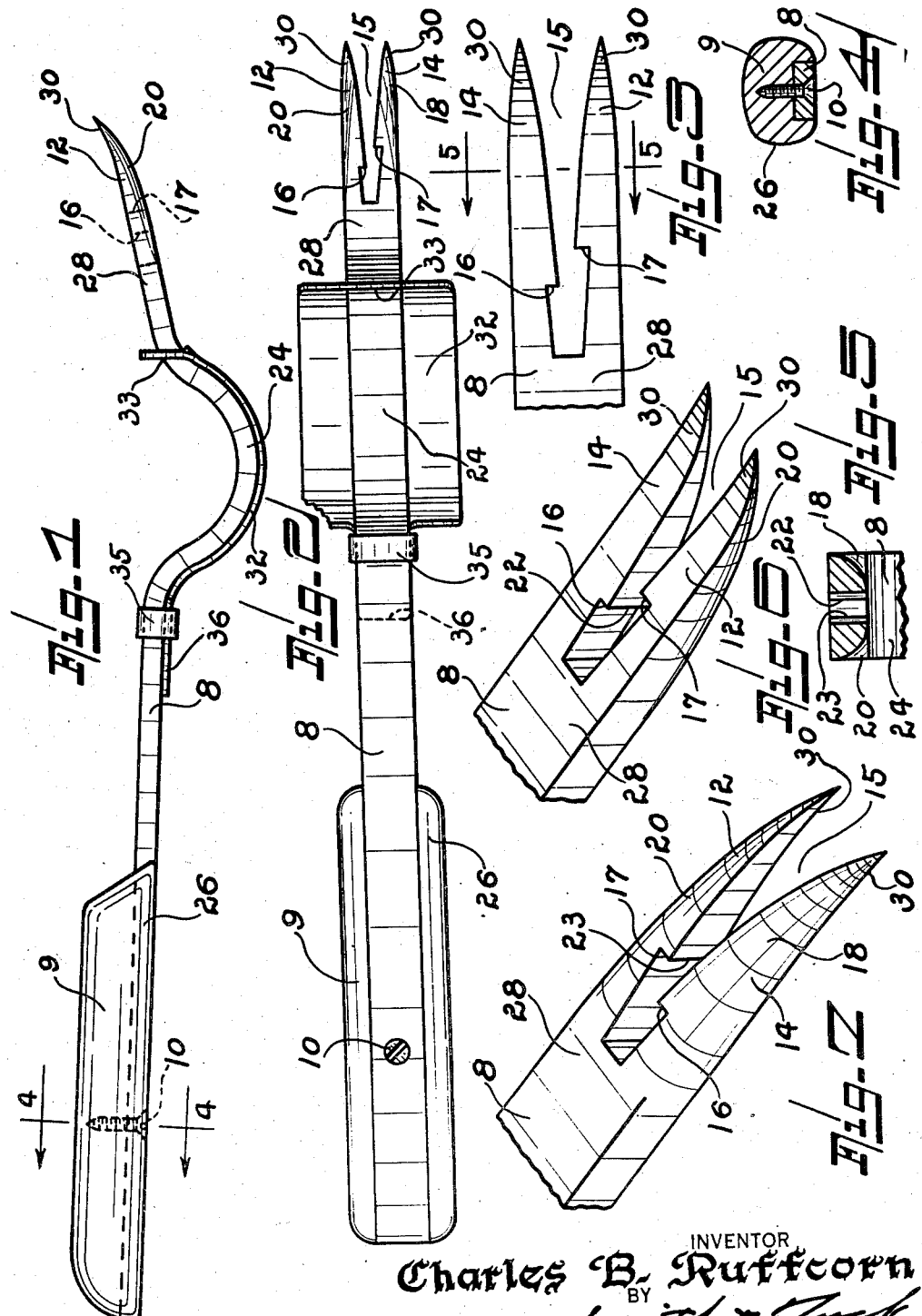

2,121,265

UNITED STATES PATENT OFFICE 2,121,265

WEEDER

Charles B. Ruffcorn, Seattle, Wash.

Application February 6, 1936, Serial No. 62,670

3 Claims. (Cl. 254—132)

My present invention relates to the art of gardening tools and more particularly to a weeder.

My present invention is intended to provide an improved garden tool which, because of its peculiar construction, is particularly adapted to pulling weeds and for thinning out plants. My tool consists essentially in a metal bar, preferably of steel, which is formed with a bifurcated end that is notched to make the holding of the weed or plant more secure. Back of the jaws, thus provided, the bar is bent in a semi-circular manner to provide a fulcrum so that the tool can be used as a lever to pry out the unwanted weed, or plant.

The principal object of my present invention is to provide a cheaply constructed sturdy tool for extracting weeds from lawns, parking strips and the like without impairing the beauty of the surrounding lawn, or to make it possible to pull plants as in the thinning operation, without injuring the adjacent plant.

A further object is to provide means that will securely engage the weed or plant that it is desired to pull, and avoid any tendency for the plant to slip out of the spaced tines.

Other and more specific objects will be apparent from the following description taken in connection with the accompanying drawing, wherein Figure 1 is a side elevation of a tool made after the teachings of my invention.

Figure 2 is a bottom plan view of the tool shown in Figure 1.

Figure 3 is a top plan view of the tine portion of my tool.

Figure 4 is a cross-sectional view taken along the line 4—4 of Figure 1 to illustrate the manner securing the handle to my device.

Figure 5 is a cross-sectional view taken along the line 5—5 of Figure 3.

Figures 6 and 7 show, in fragmentary, perspective view, the top and bottom, respectively, of the tines used with my device, so as to better illustrate the exact arrangement of notching the same.

Referring to the drawing, throughout which like reference characters indicate like parts, 8 designates the bar from which my device is formed. This I have found most conveniently formed from steel of rectangular cross-section, substantially after the proportions shown in Figures 1 and 2. At one end I secure a handle 9, preferably made of wood and recessed after the showing in Figure 4. In this manner the hands are protected from the steel on three sides and it is possible to enlarge the size of the handle without increasing the size of the steel itself. Any suitable means may be employed for securing the handle in place as, for instance, the wood screw indicated at 10. The opposite end of bar 8 should be bifurcated so as to form two tines 12 and 14. These tines should preferably be so formed as to provide a V-shaped opening 15, so that it will be relatively easy to center the device on a weed or plant root, and then, by pressing the tool forwardly the plant or weed will be forced down into the restricted portion where the offsets 16 and 17 will provide a more secure engagement for the same.

It is particularly desired to point out that it is very desirable to have the offsets 16 and 17, or more—if more were employed—disposed in staggered relationship and it has been found that when the tool is being used the stock of the plant engaged is angularly disposed with respect to the plane of the tine and the staggered offset enables the tool to grip the plant at different points along its stem so that a secure engagement is obtained, without excessive pressure at any one point, and the stem is not broken when the pulling strain is applied. In the forms illustrated in Figures 6 and 7 the under sides of the tines are curved as at 18 and 20, so as to form a sharper point and permit the insertion of the tool into relatively hard ground with a minimum of pressure. It has further been found that if the off-set 16 and 17 are provided with relatively sharp stem engaging corners as 22 and 23 and that if these engaging corners are disposed substantially at right angles to the plane of the surface of the tine, they will provide the greatest holding power.

In using my tool it has been found most desirable to use it as a lever to pry the plant, or weed, out of the ground. To this end I have provided a semi-circular bend in bar 8 as at 24. This forms a very convenient fulcrum and the added length of the handle portion 26 as against the relatively short tine portion 28 provides a mechanical advantage that is very desirable. Another detail of construction that adds materially to the usefulness of this tool is to have the tine portion 28 form in its prolongation a small angle with handle 26, substantially as shown in Figure 1. This facilitates to a marked degree the operation of the tool as does, also, the turning up of the ends of the tines as indicated at 30. For use in soft ground it is desirable to add to the bearing surface of the fulcrum; this I provide by plate 32 which is pierced at 33 to slip over the tines and is secured at its opposite end by a slip collar 35 which holds an extension 36 of plate 32 in close engagement with bar 8. When not needed the plate may be removed by sliding the collar off the extension 36 and then removing the plate.

*Method of operation*

In operating my device the tines are centered as best the operator can, upon the stem of the weed or plant it is desired to remove. The exact nature of the plant will determine, to a degree, the point engaged but, normally, it is desired to engage the root rather than the stock and for this reason it is usually desirable to press the tines somewhat into the ground. Inasmuch as the opening 15 is V-shaped it tends to center the tool on the plant stem or root and a downwardly applied pressure forces the tool down over the root so that the root or stem is forced up into the notched portion of opening 15 to a position where it is engaged by the off-sets or barbs 16 and 17. Downward pressure is then applied to handle 9 and the tool rocked upon fulcrum 24. This action causes the corners of offsets 16 and 17 to be embedded in the root or stem at spaced intervals and a continued downward pressure, on handle 9, raises the root out of the ground with a minimum of effort. The extent of the tines have been kept to a minimum so that the soil or grass roots or other plants in the vicinity of the weed, or plant removed, will not be disfigured or damaged. When the plant is loosened, if it has a deep root, the entire tool is raised upwardly off the ground completely removing the root from the ground where it may be stripped from the tines by hand, leaving the tool ready for further use.

The foregoing description and the accompanying drawing are believed to clearly disclose a preferred embodiment of my invention but it will be understood that this disclosure is merely illustrative and that such changes in the invention may be made as are fairly within the scope and spirit of the following claims.

I claim:

1. In a weeding tool the combination with a bar having a bowed portion forming a fulcrum, of a complementary bowed plate on the exterior of said fulcrum, retaining means rigid with one end of the plate for co-action with the bar, and removable retaining means mounted on the tool for co-action with the other end of the plate.

2. A weeding tool comprising a bar, one end forming a handle, a fulcrum adjacent the other end, the opposite end being bifurcated and having on each of its inner walls a rearwardly directed barb, said barbs lying in staggered relationship with each other.

3. In a weeding tool the combination of a bar having a handle, a fulcrum, and a pair of weed-engaging tines, said tines being characterized by a smooth, tapering, weed-engaging opening between the tines terminating in a throat formed by staggered barbs, a slot disposed rearwardly of said barbs forming a root engaging opening of greater width than said throat.

CHARLES B. RUFFCORN.